United States Patent [19]

Pauzé

[11] Patent Number: 4,478,913

[45] Date of Patent: Oct. 23, 1984

[54] BLENDED POLYESTERIMIDE-POLYESTERAMIDEIMIDE ELECTRICAL COATING COMPOSITIONS

[75] Inventor: Denis R. Pauzé, East Glenville, N.Y.

[73] Assignee: General Electric Company, Schenectady, N.Y.

[21] Appl. No.: 381,127

[22] Filed: May 24, 1982

Related U.S. Application Data

[63] Continuation of Ser. No. 194,975, Oct. 8, 1980, abandoned.

[51] Int. Cl.³ .................. C08L 79/08; C08L 77/00

[52] U.S. Cl. .................. 428/383; 428/375; 525/425; 525/436; 525/928

[58] Field of Search .................. 525/425, 436, 928; 428/383

[56] References Cited

U.S. PATENT DOCUMENTS

| | | | |
|---|---|---|---|
| 2,936,296 | 5/1960 | Precopio | 260/33.4 |
| 3,297,785 | 1/1967 | George | 260/850 |
| 3,342,780 | 9/1967 | Meyer | 260/75 |
| 3,426,098 | 2/1969 | Meyer | 260/841 |
| 3,428,486 | 2/1969 | George | 117/218 |
| 3,493,413 | 2/1970 | Olson | 117/218 |
| 3,555,113 | 1/1971 | Sattler | 260/842 |
| 3,620,996 | 11/1971 | Matsumura | 525/425 |
| 3,652,471 | 3/1972 | Sattler | 525/436 |
| 3,697,471 | 10/1972 | Schmidt | 260/33.4 |
| 3,865,785 | 2/1975 | Pauze | 260/75 N |
| 3,919,144 | 11/1975 | Formaini | 525/425 |
| 4,012,555 | 3/1977 | Keske | 525/436 |
| 4,070,524 | 1/1978 | Keske | 525/436 |
| 4,116,941 | 9/1978 | Hanson | 525/436 |
| 4,117,032 | 9/1978 | Kwiecinski | 525/425 |
| 4,119,605 | 10/1978 | Keating | 525/436 |

*Primary Examiner*—Paul Lieberman

*Attorney, Agent, or Firm*—Donald J. Voss

[57] ABSTRACT

Electrical coating compositions comprise blended polyesterimides and from 1 to 20 percent by weight of total solids of an ester terminated amide imide. Such compositions provide insulation coatings on electrical conductors which have superior smoothness, even after high speed coating operations.

11 Claims, No Drawings

BLENDED POLYESTERIMIDE-POLYESTERAMIDEIMIDE ELECTRICAL COATING COMPOSITIONS

This is a continuation of application Ser. No. 194,975, filed Oct. 8, 1980, now abandoned.

This invention relates to blended polyesterimide-polyesteramideimide coating compositions and to electrical conductors coated therewith.

BACKGROUND OF THE INVENTION

Schmidt et al., U.S. Pat. No. 3,697,471, disclose a family of polyesterimide resins made by reacting together at least one polybasic acid or a functional derivative thereof, and at least one polyhydric alcohol or functional derivative thereof, at least one of the reactants having at least one five-membered imide ring between the functional groups of the molecule. It is further disclosed that the reactants can be heated in a commercial cresol mixture, then further diluted in a mixture of naphtha and cresol and used as an enamel for coating copper wire to produce a hard, thermally resistant insulation therefor. Meyer et al., U.S. Pat. No. 3,426,098, describe polyesterimide resins in which all or part of the polyhydric alcohol comprises tris(2-hydroxyethyl) isocyanurate.

Sattler, U.S. Pat. No. 3,555,113, describes blends of polymeric amideimideester wire enamels and conductors coated therewith. In Sattler it is suggested that cold blends of polymeric amide-imide-esters and from 20 to 60% of a terephthalic polyester form block copolymers when deposited on a conductor and cured. Such coatings are stated to have better thermal life than coatings from the polyamideimide ester resins alone.

Applicant herein, Pauzé, U.S. Pat. No. 3,865,785, describes polyesteramideimide coating compositions with better heat shock properties than the polyesterimide resins alone.

In all cases where polyesterimide resin is used as a coating, smoothness is a problem, especially if higher coating speeds are attempted. Lack of smoothness and blistering not only do not look well, but electrical properties suffer, as is measured by the number of breaks in the insulation in a given length of wire, e.g., 200 feet. The problems can be overcome to some extent by slowing down the coating speed, but this causes losses in energy and productivity.

It has now been discovered that blending a surprisingly small amount of an ester terminated amideimide resin into a major proportion of polyesterimide resin provides a composition which runs rapidly and smoothly on conventional wire coating equipment. The coated wire, as will be seen, is superior both in appearance and in electrical properties to the best coated wires currently obtainable with polyesterimide alone. The blended composition can be used itself, it can be used in heavy builds alone, and it can be used as an undercoat or as an overcoat in dual- or poly-coated conductors of all conventional types.

DESCRIPTION OF THE INVENTION

According to the present invention, there are provided soluble coating compositions suitable for the insulation of electrical conductors comprising a blend of:

A. a polyesterimide obtained by heating ingredients comprising (a) an aromatic diamine;

(b) an aromatic carboxylic anhydride containing at least one additional carboxylic group;

(c) terephthalic acid or a reactive derivative thereof;

(d) a polyhydric alcohol having at least three hydroxyl groups;

(e) an alkylene glycol; and from 1 to 20 percent by weight of total solids of:

B. a polyesteramideimide obtained by heating (a) a tricarboxylic acid compound;

(b) a polyamine; and (c) an aliphatic dicarboxylic acid, and thereafter heating with (d) an alkylene glycol.

Among the preferred features of the present invention are electrical coating compositions as defined above in which the solids content is at least 25 parts by weight; those in which heating is carried out at a temperature from about 190° to about 250° C.; those which are homogeneously dispersed in a solvent comprising cresylic acid, alone, or in combination with an aromatic hydrocarbon; and those which also include an alkyl titanate.

Also contemplated by the present invention are electrical conductors provided with a continuous coating of the new wire enamels, as a sole coat, or as an undercoat, or as an overcoat, and cured at elevated temperatures.

With respect to polyesterimide components A.-(a)-(e), inclusive, these are conventional and well known to those skilled in this art by reason of the teachings, for example, in the above-mentioned U.S. Pat. Nos. 3,697,471 and 3,426,098.

By way of illustration, aromatic diamine component A.(a) can comprise benzidine, methylene dianiline, oxydianiline, diaminodiphenyl ketone, -sulfone, -sulfoxide, phenylene diamine, tolylene diamine, xylene diamine, and the like. Preferably, component A.(a) will comprise oxydianiline or methylenedianiline, and, especially preferably, methylenedianiline.

Illustratively, the aromatic carboxylic anhydride containing at least one additional carboxylic group component A.(b) can comprise pyromellitic anhydride, trimellitic anhydride, naphthalene tetracarboxylic dianhydride, benzophenone-2,3,2',3'-tetracarboxylic dianhydride, and the like. The preferred components A.(b) are pyromellitic anhydride or trimellitic anhydride and especially trimellitic anhydride.

Typically, terephthalic acid or a di(lower) alkyl ester ($C_1$–$C_6$) or other reactive derivative, e.g., amide, acyl halide, etc., will be used as component A.(c). A minor amount of the terephthalic acid can be replaced with another dicarboxylic acid or derivative, e.g., isophthalic acid, benxophenone dicarboxylic acid, adipic acid, etc. Preferably component A.(c) will comprise dimethyl terephthalate or terephthalic acid, and especially preferably, terephthalic acid.

As additional polyester forming ingredient A.(d) there will be employed a polyhydric alcohol having at least three hydroxyl groups. There can be used glycerine, pentaerythritol, 1,1,1-trimethylolpropane, sorbitol, mannitol, dipentaerythritol, tris(2-hydroxyethyl-)isocyanurate (THEIC), and the like. Preferably as component A.(d) there will be used glycerine or tris(2-hydroxyethyl) isocyanurate, preferably the latter.

Illustratively, the alkylene glycol component A.(d) will comprise ethylene glycol, 1,4-butanediol, trimethylene glycol, propylene glycol, 1,5-pentanediol, 1,4-cyclohexane dimethanol and the like. Preferably, the alkylene glycol will be ethylene glycol.

With respect to polyesteramideimide components B.(a)–(d), inclusive, these are conventional and well known to those skilled in this art by reason of the teachings, for example in the above-mentioned U.S. Pat. No. 3,865,785.

While trimellitic anhydride is preferred as the tricarboxylic acid material B.(a), any of a number of suitable tricarboxylic acid constituents will occur to those skilled in the art including 2,6,7-naphthalene tricarboxylic anhydride; 3,3'-4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride;diphenyl isopropylidene-3,3'-4-tricarboxylic anhydride; 3,4,10-preylene tricarboxylic anhydride; 3,4-dicarboxyphenyl- 3-carboxyphenyl ether anhydride; ethylene tricarboxylic anhydride; 1,2,5-naphthalene tricarboxylic anhydride; 1,2,4-butane tricarboxylic anhydride; etc. The tricarboxylic acid materials can be characterized by the following formula:

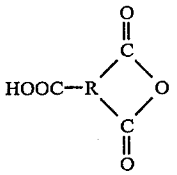

where R is a trivalent organic radical.

The aromatic polyamines useful as component B.(b) may be expressed by the formula $$X-R'-(NH_2)_n$$

where R' is a diorgano radical, for example, a heterocyclic radical, an alkylene radical, an arylene radical having from 6 to 15 carbon atoms and YGY, where Y is arylene, such as phenylene, toluene, anthrylene, arylenealkylene, such phenyleneethylene, etc.; G is divalent organo radical selected from alkylene radicals having from 1 to 10 carbon atoms,

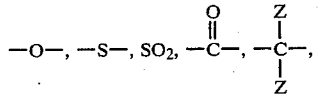

where Z is selected from methyl and trihalomethyl such as trifluoromethyl, trichloromethyl, etc., n is at least 2, X is hydrogen, an amino or organic group such as alkylene, arylene, etc. including those also containing at least one amino. Among the specific amines useful for the present invention, alone or in admixture, are the following:

4,4-diamino-2,2'-sulfone diphenylmethane
ethylenediamine
benzoguanamine
meta-phenylene diamine
para-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether.

Again, the preferred polyamines are oxydianiline or methylenedianiline.

The aliphatic dicarboxylic acid material B.(c) can be saturated or unsaturated, and can have up to about forty carbon atoms in the chain, such materials being illustrated by adipic acid, sebacic acid, azelaic acid, suberic acid, pimelic, oxalic, maleic, succinic, glutaric and dodecanedioic acid and fumaric acid. The anhydrides can be used.

Any of a number of diols or glycols can be used as B.(d). For example, those having the general formula $$OH-(R''-)_mOH$$

can be used where m ranges typically from about 2 through 12 or higher and R'' is preferably, although not necessarily, an alkylene group. Among such diols or glycols are ethylene glycol, propanediols, butanediols, pentanediols and hexanediols, octanediols, etc. Ethylene glycol is preferred.

In making the polyesterimide A. there should normally be an excess of alcohol groups over carboxyl groups in accordance with conventional practice. The preferred ratios of ingredients, and of ester groups to imide groups, are entirely conventional, see the patents cited above, and the especially preferred ratios of ingredients will be exemplified in detail hereinafter. The polyesterimide can be prepared in two ways, both of which will yield enamels suitable for blending in accordance with this invention. In one manner of proceeding, all of the reactants are added to the vessel at the beginning of the polymerization. The reaction is carried out in the usual manner, e.g., under by-product distillation conditions, e.g., at 190° to 250° C., until the acid number drops below about 6–7 mg. KOH/per gram of sample, and preferably down to less than 1.0 then the reaction heating is discontinued. The solvent can then be added to the hot mixture and it is maintained hot for the time needed to insure homogeniety. In another way, a two-stage reaction is conducted. First a hydroxyl rich polyester is prepared from ingredients (c), (d) and (e), and at the completion of this reaction, then ingredients (a) and (b) are added and the reaction carried further under by-product distillation conditions until, the acid number again falls below 6–7, e.g. to 1.0 or below. Heating is discontinued, then the solvent is again added to the hot reaction mixture, as before.

To make the polyesteramideimide, the equivalent ratio of tricarboxylic acid material such as trimellitic anhydride to aliphatic dicarboxylic acid material such as azelaic acid ranges from about 1:3 and 9:1, and is preferably 3:1. The ratio of equivalents of tricarboxylic acid material to polyamide such as methylene dianiline ranges from about 1:4 to 9:10, and is preferably about 3:4. The equivalent ratio of polyamine such as methylene dianiline to glycol such as ethylene glycol ranges from about 99:1 to 4:1 and most preferably is about 9:1. Generally, the ingredients are reacted at 190° C. to 250° C. until the desired carboxyl content is reached which is about 2.5 to 2.7 percent. The glycol is added when the tricarboxylic acid material, aliphatic acid and polyamine have been reacted to the desired carboxyl content. The tricarboxylic acid and aliphatic acid can be added together or separately to the polyamine.

As to those embodiments using a solvent, cresylic acid is the preferred aromatic solvent used in connection with the present invention. Used in connection with the cresylic acid are any of a number of hydrocarbon solvents including Solvesso 100 which is a mixture of mono-, di- and trialkyl (primarily methyl) benzenes having a flash point of about 113° F. and a distillation range of from about 318° F. to 352° F., such solvent being made by the Exxon Company. Another solvent useful in the present connection is Exxon 670 solvent, a mixture of mono-, di-, and trialkyl (primarily methyl) benzenes having a gravity API 60° F. of 31.6 percent, specific gravity at 60° F. of 0.8676, a mixed aniline point of 11° F. and a distillation range of about 288° F. to 346° F.

Enamels for coating conductors are made by blending the resins or solutions of resins A and B within the ratios set forth above and exemplified hereinafter.

The wire enamels thus made are applied to an electrical conductor, e.g., copper, aluminum, silver or stainless steel wire, in conventional application. Illustratively, wire speeds of 15 to 65 feet/min. can be used with wire tower temperatures of 250° and 920° F. The build up of coating on the wire can be increased by repetitive passes through the resin composition. The coatings produced from the present enamels have excellent smoothness, flex retention or flexibility, continuity, solvent resistance, heat aging, dissipation factors, cut through resistance, heat shock, abrasion resistance and dielectric strength.

When used as an undercoat the enamels of this invention are applied to the conductor as above-mentioned, and built up to the conventional thickness, e.g., with multiple passes. Then a lesser wall of a different, overcoat enamel is applied. This can be, without limitation, a polyamideimide, e.g., the heat reaction product of trimellitic anhydride and methylene dianiline diisocyanate, or an etherimide, a polyester, a nylon, an isocyanurated polyester polyamide, and the like. When used as an overcoat, the enamels of this invention are applied as a lesser wall over a conductor previously provided with an undercoat of a different enamel, such as polyester or a polyester imide, etc. Suitable second-type enamels are shown, e.g., in Precopio et al., U.S. Pat. No. 2,936,296; Meyer et al., U.S. Pat. No. 3,342,780; Meyer et al., Pat. No. 3,426,098; George, U.S. Pat. No. 3,428,486; and Olson et al., U.S. Pat. No. 3,493,413, all of which are incorporated herein by reference to save unnecessarily detailed description.

DESCRIPTION OF THE PREFERRED EMBODIMENTS

The following examples illustrate the present invention. They are not intended to limit the scope of the claims in any manner whatsoever.

EXAMPLE 1

(a) Polyesterimide—A polyesterimide wire enamel is made by charging a suitably sized flask with the following ingredients:

| | Parts by weight |
|---|---|
| Ethylene glycol | 214.2 |
| Terephthalic acid | 582.5 |
| Tris(2-hydroxyethyl)isocyanurate | 820.7 |
| Tetraisopropyl titanate | 22.2 |
| Cresylic acid | 1076.4 |
| Methylene dianiline | 298.1 |
| Trimellitic anhydride | 574.0 |

The ingredients are heated during about 2 hours at about 215° C. and held at this temperature for about 8 to 10 hours. Then enough cresylic acid is added to reduce the solids content to 27% by weight and the mixture is maintained at about 200° C. for 8 hours, until it is completely homogeneous.

(b) Polyesteramideimide—A vessel equipped with a thermometer, Dean Stark trap, stirrer, condenser, addition inlet and nitrogen inlet is charged with 211.5 parts of azelaic acid, 648 parts of trimellitic anhydride, 892 parts of methylene dianiline, one part of tetraisopropyl titanate and 1227 parts of a solvent consisting of 55 parts of cresylic acid and 45 parts of phenol. The contents are heated to 200° to 205° C., water being collected and the temperature maintained until a carboxyl content of 3.4 is reached. Then 3070 additional parts of the above cresylic acid-phenol solvent are added, heating being continued at about 200° C. until the carboxyl percent is about 1.8. At this point, 40 parts of ethylene glycol are added and a temperature of approximately 200° C. maintained until the percent carboxyl is 0.55. The contents are then diluted to approximately 25% solids using a solvent consisting of 75 parts cresylic acid and 25 parts of Solvesso 100 hydrocarbon. The Gardner-Holt viscosity is Z 1¾ or about 3400 centistokes at 25° C.

Shown below in the Table are the results of actual wire coating tests using a polyesterimide wire enamel of the type set forth in Example 1(a) (General Electric Company's Imidex-E) and a blend of such enamel with a polyesteramideimide enamel of the type set forth in Example 1(b). The blend is prepared by mixing 95 parts of the 27% polyesterimide enamel with 5 parts of the 25% solids polyesteramideimide enamel. The electrical conductor being coated is a copper magnet wire 0.0403 inch in diameter, the wire being cured in a 15 foot tall gas fired tower having a bottom temperature of 245° C. and a top temperature of 400° C. The wire after coating and curing are visually inspected for smoothness in the usual manner and tested for flexibility at 25% elongation; for heat shock at 220° C. after having been stretched 20% and for burnout, which is an indication of the resistance to high temperature in the winding of a stalled motor. Such tests are well known to those skilled in the art and are described, for example, in U.S. Pat. Nos. 2,936,296; 3,297,785; and 3,555,113, and elsewhere. Specifically, the flexibility of the coatings are determined by stretching the coated electrical conductor 25 percent of its original length and winding it about a stepped mandrel having diameters of one, two and three times the wire diameter, the smallest mandrel diameter at which failure does not occur being taken as the test point. Dissipation factor (D.F.) is done by immersing a bent section of coated wire in hot mercury and measuring at 60 to 1,000 hertz by means of a General Radio Bridge, or its equivalent, connected to the specimen and the mercury. The values are expressed in units of % at the specified temperature in degrees Centigrade (Reference National Electrical Manufacturers Association Publ. No. MW 1000 Part 3, paragraph 9.1.1). Heat aging is carried out by placing a coil of unstretched, unbent coated wire in an oven under the specified conditions and evaluating it after 21 hours. The values are expressed in mandrel diameters withstanding failure after 21 hours, at 175° C., and 0% stretch. Cut through temperature is done by positioning two lengths of wire at right angles, loading one with a weight and raising the temperature until thermoplastic flow causes an electrical short and the values are expressed in units comprising degrees Centigrade at 2,000 g. (Reference NEMA method 50.1.1). Dielectric strength is determined on twisted specimens to which are applied 60 hertz voltage until breakdown occurs. The breakdown voltage is measured with a meter calibrated in root-mean-square volts. The values are expressed in units comprising kilovolts (kv) (Reference NEMA Method 7.1.1).

The coated wires have the following properties:

TABLE

| Wires Coated With Polyesterimide And With Polyesterimide-Polyesteramideimide | | |
|---|---|---|
| Example | 1A** | 1 |
| Composition (parts by weight) | | |
| Polyesterimide (a) enamel | 100 | 95 |
| Polyesteramideimide (b) enamel | — | 5 |
| Conditioning | | |
| Wire Speed | 57'/min. | 57'/min. |
| Build, Mils | ~3.0 | ~3.0 |
| Properties | | |
| Smoothness | Smooth | Smoother |
| Flex, 25%, Diameters | 1 | 1 |
| Continuity, breaks/200' | 3 | 0 |
| Dissipation factor, 220° C. | 4.4 | 5.5 |
| Cut Through, °C. | 397 | 384 |
| Diel. strength, KV | 8 | 11 |
| Heat aging, 21 hrs./175° C. | 1X | 1X |
| Abrasion, single scrape | 1100 | 1300 |
| Repeat Scrape | 27 | 30 |

The wire according to this invention was smoother, and had better continuity and abrasion resistance. When the coating speed was increased to 65'/min., the polyesterimide control started to become wavy, blister and deteriorate. The blended composition according to this invention, on the other hand, coated as well at 65'/min. as it did at 57'/min.

EXAMPLE 2

Following the general procedure of Example 1, 95 parts by weight of a commercial polyesterimide derived from ethylene glycol, tris(2-hydroxyethyl)isocyanurate, methylenedianiline, trimellitic anhydride and terephthalic acid at 25% solids in cresylic acid solvent and 5 parts by weight of a commercial polyesteramideimide derived from azeleic acid, trimellitic anhydride, methylene dianiline, and ethylene glycol in a cresylic acid-phenol/hydrocarbon solvent at 27% solids are blended for 30 minutes, then filtered. The resulting composition according to this invention has a solids content of 26.0-28.0 at 200° C. and a viscosity in the range of 350-550 cps. at 30° C.

EXAMPLE 3

The general procedure of Example 2 is repeated, lowering the polyesterimide content to 93 parts by weight and raising the polyesteramideimide content to 7 parts by weight. The solids content is in the range of 26-28% by weight at 200° C., and the viscosity is in the range of 350-550 cps. at 30° C. In comparison with Example 2, this produces coated conductors with somewhat improved thermal properties.

Dual coated wires are made in a tower as described above.

In this first, a base coat of a polyester of dimethyl terephthalate, ethylene glycol and glycerine made according to Precopio et al., U.S. Pat. No. 2,936,296 is applied to a build of about 2.3 mls. To this coating is then applied a thinner, 0.3 mil. overcoating of the blended polyesterimide-polyesteramideimide of the Example. A coated copper conductor according to this invention is obtained.

In the second, a wire coated with the blended polyesterimide-polyesteramideimide of this invention (Example 1) has applied to it a thin outer coating of an amide-imide made by mixing and heating trimellitic anhydride and the diisocyanate of methylene dianiline. A coated copper conductor according to this invention is obtained.

All of the foregoing patents and publications are incorporated herein by reference. It is obviously possible to make many variations in the present invention in light of the above, detailed description. For example, the alkyl titanate can be omitted. Blocked polyisocyanates and/or phenol-formaldehyde resin can be added or they can be substituted with a melamine-formaldehyde resin. Metal driers can also be added, e.g., 0.2 to 1.0% based on total solids, of zinc octoate, cadmium linoleate, calcium octoate, and the like. All such obvious variations are within the full intended scope of the appended claims.

I claim:

1. A soluble coating composition suitable for the insulation of electrical conductors comprising a blend of:

A. a polysterimide obtained by heating the following ingredients to a temperature of from about 190° C. to about 250° C., said ingredients comprising:
 (a) an aromatic diamine;
 (b) an aromatic carboxylic anhydride containing at least one additional carboxylic group;
 (c) terephthalic acid or a reactive derivative thereof;
 (d) a polyhydric alcohol having at least three hydroxyl groups;
 (e) an alkylene glycol; and B. the polyesteramideimide of this B in a concentration of from about 1 to about 20 percent by weight of the total solids content of the polyesterimide of A above and the polyesteramideimide of this B obtained by heating the following ingredients to a temperature of from about 190° C. to about 250° C., said ingredients comprising
 (a) a tricarboxylic acid compound;
 (b) a polyamine; and
 (c) an aliphatic dicarboxylic acid,
 (d) and thereafter adding an alkylene clycol to the reaction product of B(a), (b) and (c) when the special product has a carboxyl content is from about 2.5 to about 2.7.

2. A composition as defined in claim 1, wherein the solids content is at least 25 parts by weight per 100 parts by weight of the total composition, and the composition is homogeneously dispersed in a solvent medium comprising predominantly cresylic acid, alone, or in further combination with a hydrocarbon.

3. A composition as defined in claim 1, which also includes an alkyl titanate.

4. A coating for electrical wires comprising a blended polyesterimide polyesteramideimide product obtained by separately heating at from about 190° C. to about 250° C. the ingredients of A and B below comprising:

A.
 (a) methylene dianiline;
 (b) trimellitic anhydride; the molar ratio of (a) and (b) being 2:1;
 (c) terephthalate acid;
 (d) tris(2-hydroxyethyl) isocyanurate; and (e) ethylene glycol; and

B.

(a) trimellitic anhydride;

(b) methylene dianiline;

(c) azaleic or adipic acid; and, thereafter (d) ethylene glycol until two resins are obtained and blending them together to provide from 1 to 20 percent by weight of B per total weight of the solids of A and B reaction products.

5. An electrical wire enamel as defined in claim 4, which also includes tetraisopropyl titanate.

6. An electrical conductor provided with a continuous coating of the blended resinous polyesterimide-polyesteramideimide composition of claim 1.

7. An electrical conductor provided with a continuous coating of the blended resinous polyesterimide-polyesteramideimide of claim 4.

8. An electrical conductor provided with a continuous coating of the blended resinous polyesterimide-polyesteramideimide composition of claim 1 and a a second continuous coating of a wire enamel of a different type directly covering said polyesterimide-polyesteramideimide coating.

9. An electrical conductor provided with a continuous coating of the blended resinous polyesterimide-polyesteramideimide of claim 4 and a second continuous coating of a wire enamel of a different type directly covering said polyesterimide-polyesteramideimide coating.

10. An electrical conductor provided with a continuous coating of a first wire enamel which is free of blended polyesterimide-polyesteramideimide and second coating of high solids content blended polyesterimide-polyesteramideimide composition of claim 1 directly covering said first wire enamel.

11. An electrical conductor provided with a continuous coating of a first wire enamel which is free of blended polyesterimide-polyesteramideimide and a second coating of the high solids content polyesterimide-polyesteramideimide composition of claim 4 directly covering said first wire enamel.

* * * * *